United States Patent [19]

Cyr

[11] Patent Number: 4,681,055
[45] Date of Patent: Jul. 21, 1987

[54] ADAPTER SYSTEM FOR MARINE AUTO PILOT

[76] Inventor: John F. Cyr, 41 Kindred Ave., Stuart, Fla. 33494

[21] Appl. No.: 804,870

[22] Filed: Dec. 5, 1985

Related U.S. Application Data

[63] Continuation-in-part of Ser. No. 445,245, Dec. 20, 1982, abandoned.

[51] Int. Cl.$^4$ ............................................. B63H 25/04
[52] U.S. Cl. .................................. 114/144 E; 318/588
[58] Field of Search ....................... 114/144 R, 144 E; 74/388 PS, 480 B; 180/141, 142, 161; 318/588

[56] References Cited

U.S. PATENT DOCUMENTS 3,138,133  6/1964  Hatch ............................. 114/144 R
4,170,953  10/1979  Pounder et al. ................. 114/144 E Primary Examiner—Sherman D. Basinger
Attorney, Agent, or Firm—Melvin K. Silverman

[57] ABSTRACT

An automatic control system for a craft having a steering wheel connection for manual guidance of the craft, an automatic pilot sensing system connection, and a drive shaft connection for driving the craft's steerage mechanism. The automatic control system is provided with sensing signals for correction of heading by well-known auto pilot. The steering wheel is removed from the drive shaft and the automatic control system is easily installed between the drive shaft and the steering wheel. The automatic control system provides a steering shaft adaptor which provides the drive and mounting element to the craft's steering mechanism without modification to any existing components in the craft.

7 Claims, 5 Drawing Figures

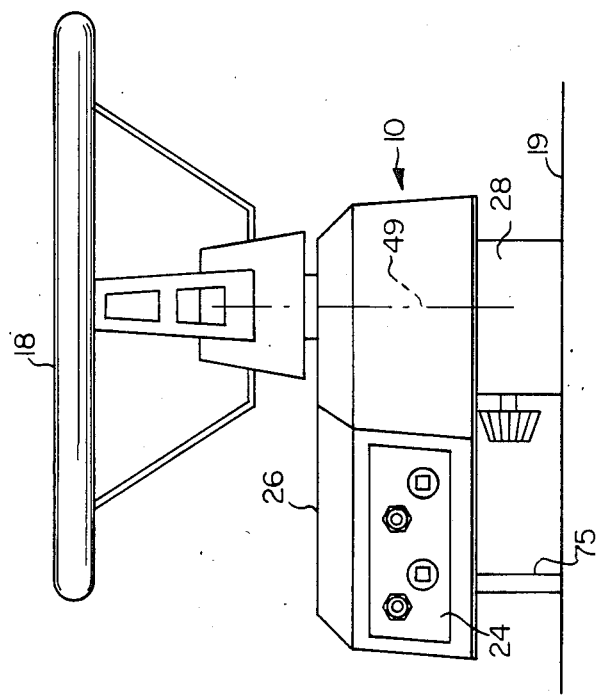
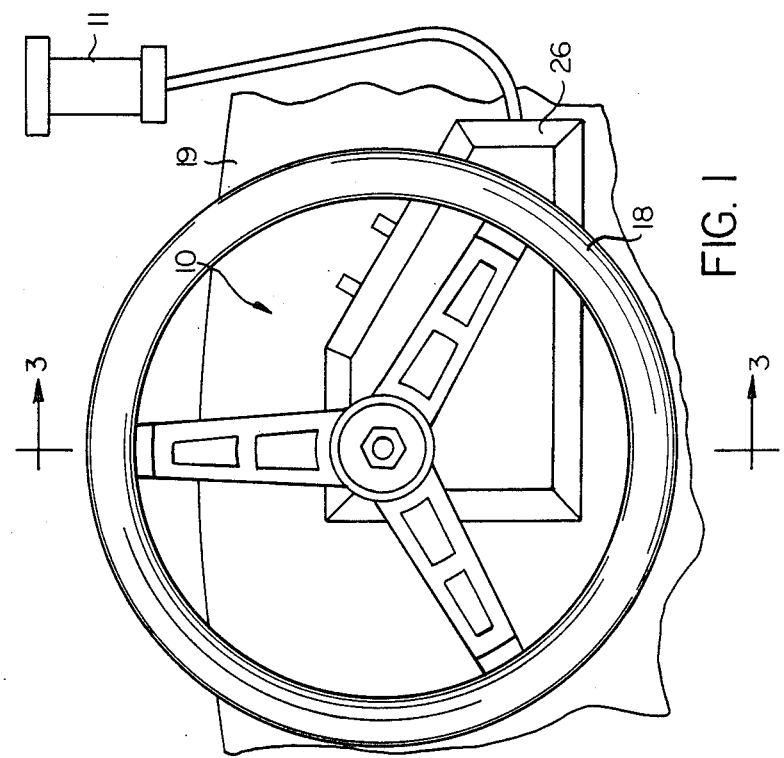

4,681,055

ADAPTER SYSTEM FOR MARINE AUTO PILOT

REFERENCE TO RELATED APPLICATION

This is a continuation-in-part of application Ser. No. 445,245, filed on Dec. 20, 1982, now abandoned.

BACKGROUND OF THE INVENTION

This invention relates generally to automatic directional control of a craft and particularly to automatic pilots for watercraft having a steering wheel apparatus connected to the steerage mechanism.

It is well known that the installation of an automatic pilot device to a given craft is often a difficult, time-consuming and expensive process. It can contribute a major expense over and above the cost of well-known auto pilot equipment. This becomes more evident in installing such devices aboard smaller crafts where space requirements are more stringent and the total cost of the equipment installed in the craft becomes a larger percentage of the total investment in the vessel to be steered by the automatic pilot.

The installation of an automatic pilot aboard a craft normally requires modification to the steering system of the craft and thus is normally accomplished by trained technicians with expertise in that field. The installation involves attaching a sprocket or gear to the existing steering system in order to provide a means of applying power from the automatic pilot servo mechanism to the steering system and thus to the rudder or other means of steering the craft. This process of installation also involves mounting and aligning a drive chain and building special mounting brackets to accommodate a given craft, thus accomplishing the purpose stated above.

Devices such as shown in the W. B. Hatch U.S. Pat. No. 3,138,133 show how complex interconnection mechanism have been used in the past to interconnect well-known auto pilot to a drive system. Devices such as shown in Edwin J. Pounder et al U.S. Pat. No. 4,170,953 also discloses the gear train drive system necessary to provide automatic steering to the spokes of a wheel-operated steering mechanism input signals from well-known automatic pilots.

SUMMARY OF THE INVENTION

The invention constitutes a system for enabling selective manual or autopilot control of a craft, for use with an autopilot device providing error signals to maintain a craft's heading in a pre-selected direction, the system adapted for mounting between the steering wheel of the craft and the steering wheel shaft thereof. The system comprises: a system housing connectable between said steering wheel and said steering wheel shaft; a servo mechanism in said housing electromechanically communicating with said autopilot device, said servo mechanism having a mechanical output; a servo interface in said housing, connected to said mechanical output of said servo mechanism, said servo interface connected to a first gear; an adapter in said housing connected between said steering wheel and said wheel shaft, said adapter configured for ease of installation of said autopilot device between said steering wheel and said steering wheel shaft without need for specialized hardware, said adapter connected to a second gear; and a means for selective mechanical coaction of said adapter and said servo output, said co-action means providing both an autopilot control of said steering wheel shaft and, alternatively, providing normal manual control of said steering wheel shaft, said co-action means further comprising means for selectively coupling and decoupling of the mechanical output of said servo mechanism to and from said adapter, said coupling and decoupling including displacement means to non-frictionally engage or disengage respectively, said first gear from said second gear, said second gear being stationary relative to said first gear.

The automatic control system and steering shaft adaptor are so arranged that the original steering wheel of the craft can be re-installed onto the adaptor to allow both manual steering as well as automatic steering of the vessel. The automatic control system includes one other interconnect between the case and the dashboard to prevent rotation of the case.

The above automatic control system for an automatic pilot thus provides an automatic pilot servo mechanism, control panel and clutch arrangement which is contained in one single package that is easily mounted at the helm station for easy access by the operator of the craft in a normal manner without modifying the craft making the pilot station available to the operator as it was prior to installation of the automatic pilot system.

The automatic pilot servo mechanism is attached to the panel where the helm station is mounted to provide a fixed point from which to apply rotational torque to the steering shaft of the vessel.

It is therefore an object of this invention to provide an easily-installable automatic control system.

It is another object of this invention to provide an inexpensive automatic control system for an automatic pilot which requires no modifications to the existing steering system of the craft.

In accordance with these and other objects which will be apparent hereinafter, the instant invention will now be described with particular reference to the accompanying drawings.

BRIEF DESCRIPTION OF THE DRAWINGS

FIG. 1 is a front perspective view of the inventive control system as installed upon the dashboard of a boat.

FIG. 2 is a side perspective view of the control system shown in FIG. 1.

DETAILED DESCRIPTION OF THE INVENTION

Figure 4:
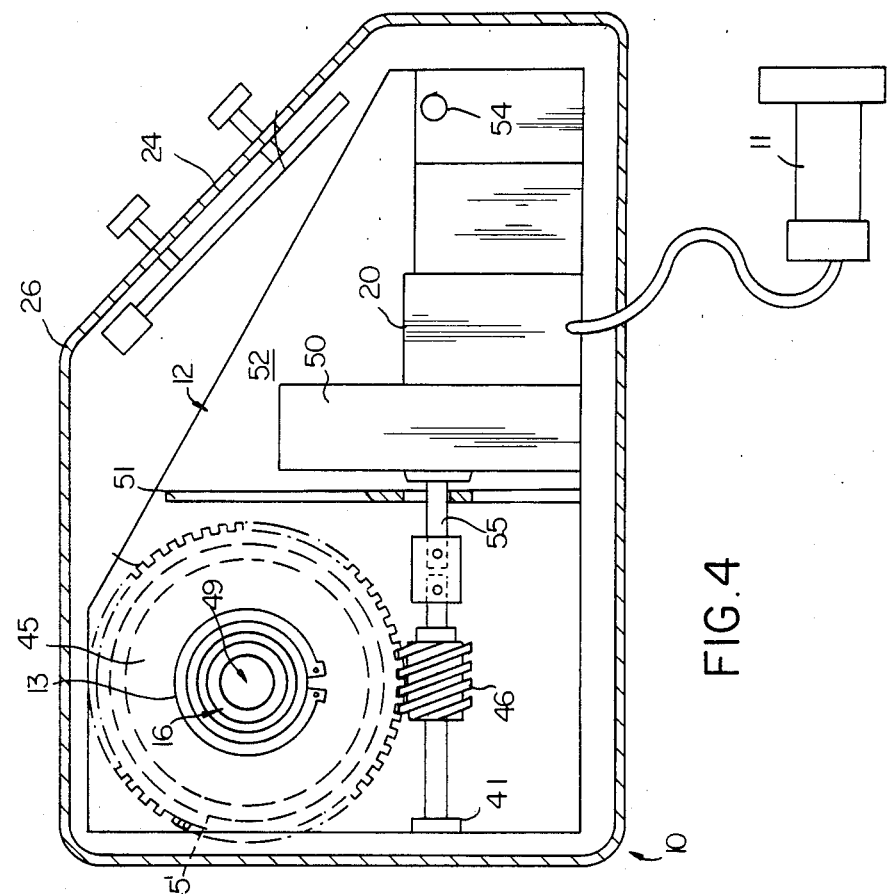
FIG. 4 is a front plan view of the inventive adaptor system for an automatic pilot device, said view taken from the same direction as that of FIG. 1, however, with the housing of the system removed.

The present invention is best understood with reference to an automatic pilot system (See FIGS. 2 and 4) that includes a direction sensing means 11 (hereinafter DSM 11) such as any of a number of well-known autopilots. In such a DSM 11, there is provided an inventive engagement control means 12 (hereinafter ECM 12) connected between a steering wheel 18 and a steering wheel driveshaft 28. The DSM 11 is connected to the ECM 12 through a servo 20 to provide continuously generated-correction control drive signals.

The ECM 12 is connected to the steering wheel shaft 28 and to steering wheel 18 by a steering wheel shaft adaptor 16 designed for convenient mechanical interfacing with the steering wheel 18 of a craft o boat having the DSM 11.

In practice, the steering wheel 18 is connected to wheel shaft 28 of the craft thru the adaptor 16 and wheel shaft 28 is also connected to a dashboard panel 19 of the boat. Further, the wheel shaft 28 is connected to the craft's steerage mechanism (not shown).

The DSM 11 may be placed behind the panel 19 or at any remote location as may be desired. (See FIG. 1).

It is to be appreciated that the DSM 11 activates the automatic pilot servomechanism 20 (hereinafter servo 20) that is secured on the ECM 12. ECM 12 is itself positioned within the system housing 26. (See FIG. 4). It may be seen that servo 20 drives adaptor 16 thru a first gear, hereinafter termed worm gear 46. The adaptor 16 is centrally disposed within hub 13 of a second gear, hereinafter termed drive gear 42.

Figure 3:
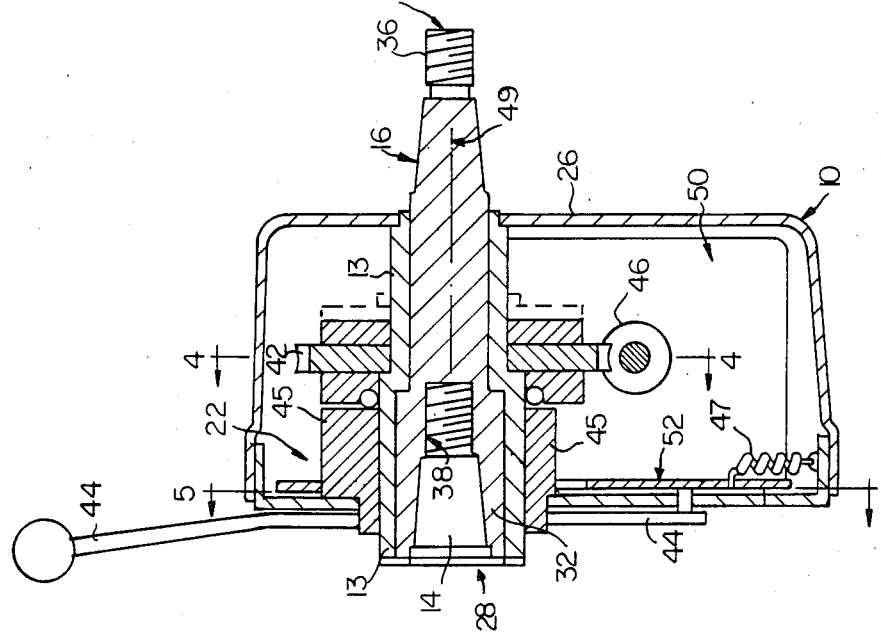
FIG. 3 is a axial cross-sectional view of FIG. 1 taken along Line 3—3 thru the steering shaft adaptor.

With reference to FIG. 3, it may be noted that adaptor 16 includes female connector end 32 having threads 38. The threads 38 receive wheel shaft 28 thru hollow end 14 of the adaptor 16. At the other end of adaptor 16, the steering wheel 18 mates with adaptor 16 at a male connector end 36. Therein, it is to be seen that adaptor 16 includes said female connector end 32 which mirrors the threaded opening or recess in the steering wheel shaft 28 of the craft. At its other end, the adaptor 16 includes male connector end 36 having threads that mirror the distal end of steering wheel 18. The adaptor 16 is, in addition, keyed to driving hub 13 (See FIGS. 3 and 4) of drive gear 42 such that the adaptor 16 will rotate whenever gear 42 is rotated.

In the above system, steering wheel 18 may be re-installed after the automatic pilot system 10 and DSM 12 have been installed.

Figure 5:
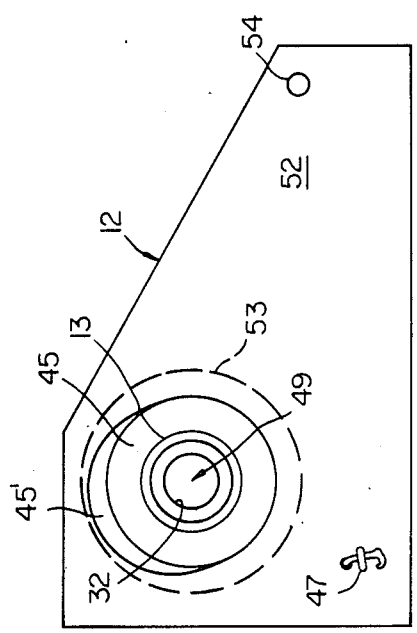
FIG. 5 is a schematic view of the control arm of the adaptor system in an engaged position.

By further reference to FIGS. 3 thru 5, it may be seen that engagement control means 12 also comprise a cam or eccentric 45. The ECM 12 is actuated by a control arm 44 which is fixed to said eccentric 45. Thereby, when control arm 44 is rotated, it will cause the rotation of a eccentric 45 with a corresponding change in the eccentric perimeter 45' of eccentric 45. (See FIG. 5). Thereby, eccentric 45 and its perimeter 45' will, through the rotation of control arm 44, move into engagement with opening 53 of plate 52 (of ECM 12) to thereby selectively engage or disengage worm gear 46 from drive gear 42. In FIGS. 4 and 5 it is noted that eccentric 45 causes plate 52 to pivot about pivot point 54, and causes shaft 28 to displace radially in the plane of FIG. 5.

In FIG. 4, it may be seen that plate 52 supports worm gear 46 between post 41 and gearbox 50.

ECM 12 provides a reliable and economical way to selectively engage or disengage the servo 20 from the drive gear 42 and, thereby, from steering shaft adaptor 16. That is, by providing a simple method for disengaging gears 42 and 46, a convenient method of disengaging the servo 20 from the adaptor 16 and thereby the steering wheel shaft 28 is achieved. More particularly, by rotating control arm 44 in a first direction in the plane of FIG. 4, eccentric 45 is rotated as is plate 52 and, in turn, re-centering spring 47 which is attached to plate 52.

ECM 12 will provide self-correcting steering of the craft thru the use of DSM 11. When the control arm 44 is rotated in an opposite direction, the gears 42 and 46 are separated to thereby permit manual steering of the craft.

With reference to FIGS. 4 and 5, it is seen that control arm 44 rotates annular hub 13 and, thereby, eccentric 45 and its perimeter 45' about center line 49. This will rotate plate 52 about pivot point 54 and relative to circular opening 53. The eccentric perimeter 45' will engage the inside of circular opening 53. Therein, worm gear 46, when in an engaged position, will co-act with drive gear 42. Gear 42 will turn rotate steering shaft 28 which is attached to adaptor 16 and hub 13. This movement of steering shaft 28 acts to apply correction to the rudder of the craft to bring the craft back to its pre-set heading when deviation occurs from the pre-set heading.

In the embodiment of FIGS. 3 thru 5, worm gear 46 is positioned between post 41 and transverse plate 51. In the same axis as gear 46 is gear box 50 and servo 20, all of which elements are secured to plate 52. As noted, the entire plate 52, with all of its above-set forth secured components, rotates about pivot pin 54 responsive to rotation of control arm 44. Such motion will vary the center line 49 (longitudinal axis of FIG. 3) distance between worm gear 46 and drive gear 42: under all conditions, gear 42 remains stationary. It is only plate 52 and its worm gear 46 that will move relative to center line 49. It is, thereby, to be understood that the craft may be operated automatically through the use of the servo 20 when gears 42 and 46 are engaged and, alternatively. may be operated manually when said gears are disengaged. Further, in an emergency, the craft operator may override the servo by forcing the steeing wheel 18 in the desired direction. This will cause the worm gear 46 to bounce out of engagement with driven gear 42 regardless of the information being generated by DSM 11 and servo 20.

Adaptor 16 and drive gear 42 are keyed to hub 13 to prevent relative motion therebetween.

With reference to FIG. 2 it may be seen that housing 26 is held in position by the adaptor along center line 49 and support bar 75. This bar prevents rotation of the system housing 26.

With further reference to FIG. 2 it is noted that calibration panel 24 is connected to a power source, the DSM 11 and the servo 20. Once electrical power is supplied to DSM 11 and the servo 20, gear box 50 becomes operative and the proper amount of mechanical correction based upon an error signal from the DSM 11 is transmitted to the steering wheel shaft 28 in the conventional fashion.

In view of the foregoing, the present invention may be viewed as an adaptor system for an automatic pilot device (the above-referenced DSM 11), the direction sensing means providing error signals for use to maintain a craft's heading in a pre-selected direction. The inventive system is adapted for placement between steering wheel 18 of the craft and the steering wheel shaft 28 thereof. A servo 20 in housing 26 is connectible to said DSM 11 and to a power source. The servo 20 possesses a mechanical output such as gearbox 50 and its output shaft 55. The mechanical outputs 50 and 55 are connected to a first gear, above-described as worm gear 46. There is further provided a steering shaft adaptor 16 connected between said steering wheel and said steering wheel shaft. Adaptor 16 provides for simplicity of installation, as a unit, of an otherwise conventional auto pilot device, between the steering wheel and steering wheel shaft, without need for specialized hardware. The adaptor 16 is in fixed rotational engagement with a second gear, above described as drive gear 42. There is provided coupling means, including radial displacement means such as control arm 44, to selectively and non-frictionally engage and disengage said first gear 46 from said second gear 42. Selective engagement of said first and second gears provides automatic or manual operation of the steering wheel of the craft thru the selective coupling of the steering wheel shaft to the mechanical output of the servo 20, through said adaptor 16, as may be desired by the operator of the craft.

It is to be appreciated that the selective engagement between said first and second gears is completely non-frictional; in that sense, the present coupling system between first and second gears cannot be viewed as a clutch of any sort.

While there has been herein shown and described the preferred embodiment of the present invention, it is to be understood the invention may be embodied otherwise than is herein illustrated and described and that in said embodiments, certain changes in the detailed construction, and in the form and arrangement of parts may be made without departing from the underlying idea or principles of this invention within the scope of the appended claims.

I claim:

1. A system for enabling selective manual or autopilot control of a craft, for use with an autopilot device providing error signals to maintain a craft's heading in a pre-selected direction, the system is adapted for mounting between the steering wheel of the craft and the steering wheel shaft thereof, the system comprising:
   (a) a system housing connectable between said steering wheel and said steering wheel shaft;
   (b) a servo mechanism in said housing electro-mechanically communicating with said autopilot device, said servo mechanism having a mechanical output;
   (c) a servo interface in said housing, connected to said mechanical output of said servo mechanism, said servo interface connected to a first gear;
   (d) an adapter in said housing connected between said steering wheel and said wheel shaft, said adapter configured for ease of installation of said autopilot device between said steering wheel and said steering wheel shaft without need for specialized hardware, said adapter connected to a second gear; and
   (e) means for selective mechanical co-action of said adapter and said servo output, said co-action means providing both an autopilot control of said steering wheel shaft and, alternatively, providing normal manual control of said steering wheel shaft, said co-action means further comprising means for selectively coupling and decoupling of the mechanical output of said servo mechanism to and from said adapter, said coupling and decoupling including radial displacement means to non-frictionally engage or disengage, respectively, said first gear from said second gear, said second gear being stationary relative to said first gear.

2. The system as recited in claim 1 in which said displacement means comprises:
   an eccentric element.

3. The system as recited in claim 2 in which said co-action means includes a sleeve for holding said adapter, said adapter having means on either end thereof to accomplish connection to the existing steering wheel and steering wheel shaft, wherein said adapter defines a replaceable adapter for providing interconnectability of said autopilot output, with differing steering wheels and steering wheel shafts.

4. The system as set forth in claim 2 further comprising: said autopilot device comprising a sensing system for detecting the craft's direction; means for determining the craft's direction of movement relative to that direction preselected by the operator; and means for producing a signal proportional to the difference between said directions; and
   means for manual engagement or disengagement of said first gear from said second gear.

5. The system as recited in claim 2 in which said displacement means further comprises a plate having an opening, the center of which is pivoted about a normally disposed, and not co-linear with said center, axis, in which said servo output and said first gear also pivot about said axis.

6. The system as set forth in claim 5 further comprising: said autopilot device comprising a sensing system for detecting the craft's direction; means for determining the craft's direction of movement relative to that direction preselected by the operator; and means for producing a signal proportional to the difference between said directions; and
   means for manual engagement or disengagement of said first gear from said second gear.

7. The system as set forth in claim 6 in which said first gear comprises a worm gear.

* * * * *